United States Patent
Shah et al.

(10) Patent No.: US 7,975,498 B2
(45) Date of Patent: Jul. 12, 2011

(54) INTELLIGENT CONTROLLER FOR REFRIGERATING AND AIR CONDITIONING SYSTEMS

(75) Inventors: Prasanna Manhar Shah, Sunnyvale, CA (US); Adnan Aslam, San Jose, CA (US); James Anthony Italiano, Crestline, CA (US)

(73) Assignee: The Product Group, LLC, Anaheim, CA (US)

(*) Notice: Subject to any disclaimer, the term of this patent is extended or adjusted under 35 U.S.C. 154(b) by 817 days.

(21) Appl. No.: 11/918,031

(22) PCT Filed: Apr. 5, 2006

(86) PCT No.: PCT/US2006/012702
§ 371 (c)(1),
(2), (4) Date: Oct. 4, 2007

(87) PCT Pub. No.: WO2006/108056
PCT Pub. Date: Oct. 12, 2006

(65) Prior Publication Data
US 2009/0068025 A1    Mar. 12, 2009

(51) Int. Cl.
*F25B 49/00* (2006.01)
*F04B 49/06* (2006.01)
(52) U.S. Cl. ....................... 62/228.3; 417/44.2
(58) Field of Classification Search ............... 62/228.1, 62/228.3; 417/44.2, 44.3, 410.1
See application file for complete search history.

(56) References Cited

U.S. PATENT DOCUMENTS

| | | | |
|---|---|---|---|
| 4,487,031 A | 12/1984 | Rogers et al. | |
| 4,523,435 A | 6/1985 | Lord | |
| 4,848,096 A | 7/1989 | Funahashi et al. | |
| 5,209,076 A | 5/1993 | Kauffman | |
| 5,761,918 A | 6/1998 | Jackson et al. | |
| 6,017,192 A | 1/2000 | Clack et al. | |
| 6,105,380 A | 8/2000 | Yokomachi et al. | |
| 6,481,227 B1 | 11/2002 | Ota et al. | |
| 6,499,308 B2 | 12/2002 | Inoue et al. | |
| 6,519,960 B2 | 2/2003 | Suitou et al. | |
| 6,622,500 B1 | 9/2003 | Archibald et al. | |
| 6,658,373 B2 | 12/2003 | Rossi et al. | |
| 6,715,304 B1 | 4/2004 | Wycoff | |
| 6,796,137 B2 | 9/2004 | Liu et al. | |
| 6,804,970 B2 | 10/2004 | Saeki et al. | |
| 6,817,193 B2 | 11/2004 | Caesar et al. | |
| 6,973,794 B2 | 12/2005 | Street et al. | |
| 2002/0136641 A1* | 9/2002 | Braun | 417/12 |
| 2008/0260540 A1* | 10/2008 | Koehl | 417/44.2 |

* cited by examiner

*Primary Examiner* — Marc E Norman
(74) *Attorney, Agent, or Firm* — Donald E. Schreiber

(57) ABSTRACT

An intelligent controller (68), adapted for regulating operation of either a refrigeration system or an air conditioning system (20), receives an output electrical signal produced by a pressure sensor (72, 74, 76, 78) included in the system (20). Responsive to the received electrical signal, the intelligent controller (68) energizes operation of a motor (24) that drives a compressor (22) included in the system (20). The programmable electronic circuit (68) performs a calibration operation in which the circuit (68) measures the output electrical signal received from the pressure sensor (72, 74, 76, 78) and stores as an offset the value so measured. The programmable electronic circuit (68) subsequently applies the stored offset for adjusting a value of the output electrical signal received from the pressure sensor (72, 74, 76, 78) during normal operation of the system (20).

8 Claims, 11 Drawing Sheets

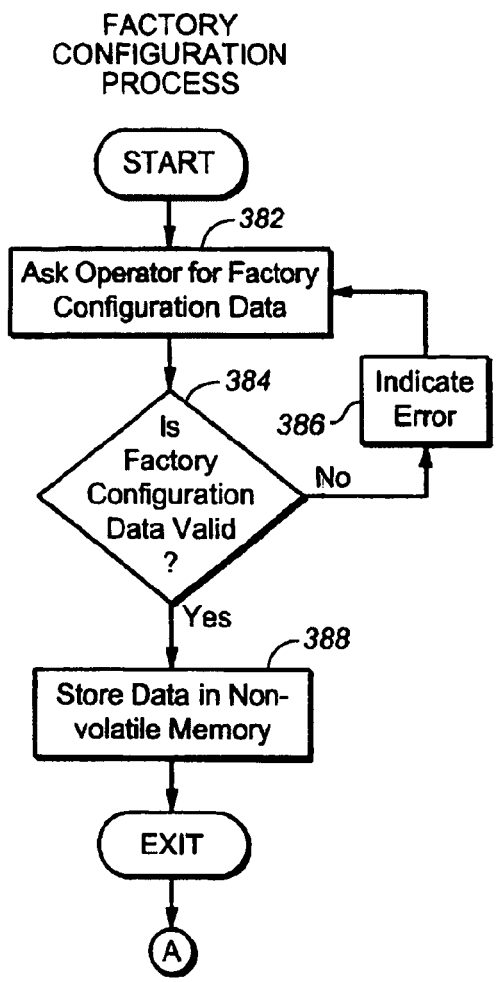
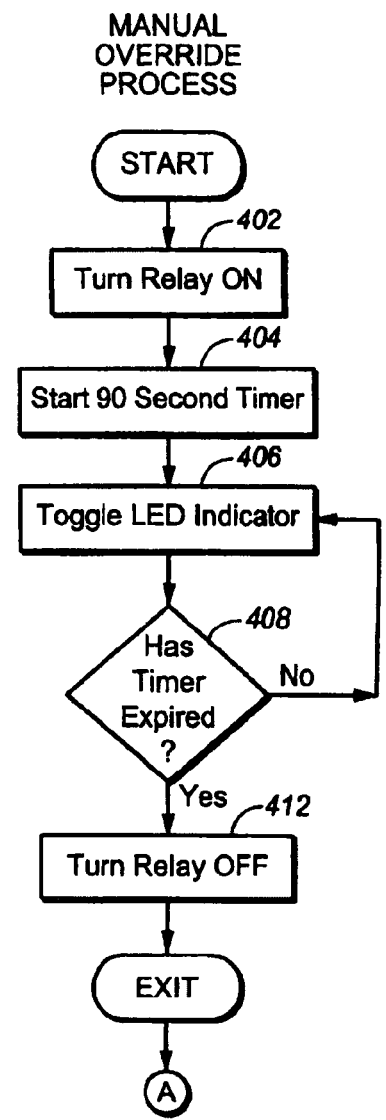
FIG. 5
FIG. 6

INTELLIGENT CONTROLLER FOR REFRIGERATING AND AIR CONDITIONING SYSTEMS

TECHNICAL FIELD

The present disclosure relates generally to the refrigerating and air conditioning systems and, more particularly, to controllers which improve such system's operation.

BACKGROUND ART

Operating refrigeration and air conditioning systems provide cooling by a change of state of a fluid refrigerant from a liquid state to a gaseous state in an evaporator coil. These systems cycle refrigerant in a closed-loop in which gaseous refrigerant leaving the evaporator coil is compressed by a motor driven compressor, returns to the liquid state in a condenser coil, then passes through an expansion valve, and then returns again to the evaporator coil.

Historically, refrigeration and air conditioning systems have used either mechanical bellows modules or expensive electronic modules for turning compressor motors on and off. Mechanical bellows type modules have been used for more than 70 years and are unsuitable for fine adjustments and accurate pressure sensing and precise compressor motor control. More expensive electronic control modules have been available for a few years but lack flexibility, programming advantages and accuracy.

U.S. Pat. No. 5,209,076 entitled "Control System for Preventing Compressor Damage in a Refrigeration System" discloses a microprocessor based monitoring device for refrigeration systems that uses sensors which detect various conditions at selected locations in a refrigeration system. Pressure and temperature sensors on the suction side of the refrigeration system's compressor provide information that allows computing the superheat. The microprocessor accepts entry of high and low safety limits for superheat for a specified refrigerant. If measured superheat falls outside of a programmed safety range, the microprocessor automatically shuts off the compressor motor, and generates an alarm signal to indicate that a problem has occurred.

Additional sensors monitor refrigeration system conditions such as the compressor discharge pressure and temperature, motor current and oil pressure. Similarly, the microprocessor accepts entry of safety limits for these conditions, and the microprocessor automatically shuts off the compressor motor, and generates an alarm signal if the refrigeration system is operating outside of a safe operating range with respect to any of the monitored conditions. To prevent aberrational or transient conditions from shutting down the refrigeration system, each monitored parameter is assigned a time-out interval throughout which an abnormal condition must persist before the microprocessor automatically shuts off the compressor motor.

The refrigeration system microprocessor based monitoring device can be incorporated as an original part of a refrigeration system, it can be added as an after market item permanently installed on an existing refrigeration system, or it can be used as a portable service tool which can be temporarily attached to a refrigeration system to obtain representative samples of the system's operating characteristics. The microprocessor based monitoring device can collect refrigeration system data over an extended time interval to identify any trends that may occur. For example, the disclosed monitoring device can sense each operating condition every ten minutes over a period of five days, and the data can be presented in the form of a graph or in any other meaningful format.

Preferably, the refrigeration system monitor includes a display such as a liquid crystal display, along with a key pad for entering program commands and functions and LED indicators for identifying alarm conditions. The data can be displayed on the monitor's LCD screen, printed out by a printer, or transmitted via a modem over telephone lines to allow displaying on a remote computer screen. Alternatively, the unit can be programmed to automatically dial a programmed telephone number if the refrigeration system should shut down so that appropriate personnel are alerted to the problem and can take whatever corrective action is indicated under the circumstances.

DISCLOSURE

One object of this invention is to provide an improved stand-alone micro-processor based controller for commercial refrigeration systems.

Another object of this invention is to provide a stand-alone controller for commercial refrigeration systems that permits specifying parameters for the system's operation to better that operation through precise, accurate micro-processor control which yields repeatable run sequences that exhibit defined pressure-to-temperature correlations.

A further object of this invention is to provide a stand-alone controller for commercial refrigeration systems that increases its efficiency thereby reducing its energy consumption.

An additional object of this invention is to provide a stand-alone controller for commercial refrigeration systems having improved and increased functionality via selection and assignment of single or multiple refrigeration system operating modes separately or concurrently.

Another object of this invention is to provide a stand-alone controller for commercial refrigeration systems which is tamper proof.

One more object of this invention is to provide a stand-alone controller for commercial refrigeration systems adapted for calibrating selected sensors to automatically compensate for ambient atmospheric pressure about the refrigeration system.

Briefly, disclosed is an intelligent controller adapted for regulating operation of either a refrigeration system or an air conditioning system. The refrigeration or air conditioning system includes among other components at least:
1. a compressor;
2. an electric motor that drives the compressor;
3. a compressor suction line connected to an intake side of the compressor; and
4. a compressor discharge line connected to a discharge outlet side of the compressor.

In accordance with the present disclosure the refrigeration or air conditioning system further includes at least one pressure sensor for producing an output electrical signal that corresponds to pressure existing at the pressure sensor.

The intelligent controller includes a programmable electronic circuit for receiving the output electrical signal produced by the pressure sensor and responsive thereto energizing operation of the motor thereby regulating operation of the system. The programmable electronic circuit performs a calibration operation in which the circuit measures the output electrical signal received from the pressure sensor and stores as an offset the value so measured. The programmable electronic circuit subsequently applies the stored offset for adjusting a value of the output electrical signal received from the pressure sensor during normal operation of the system.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 5 is a decisional flow chart depicting a sequence of operations performed during factory configuration of the intelligent controller;

FIG. 6 is a decisional flow chart depicting a sequence of operations performed during a manual override process executed by the intelligent controller;

BEST MODE FOR CARRYING OUT THE DISCLOSURE

Figure 1:
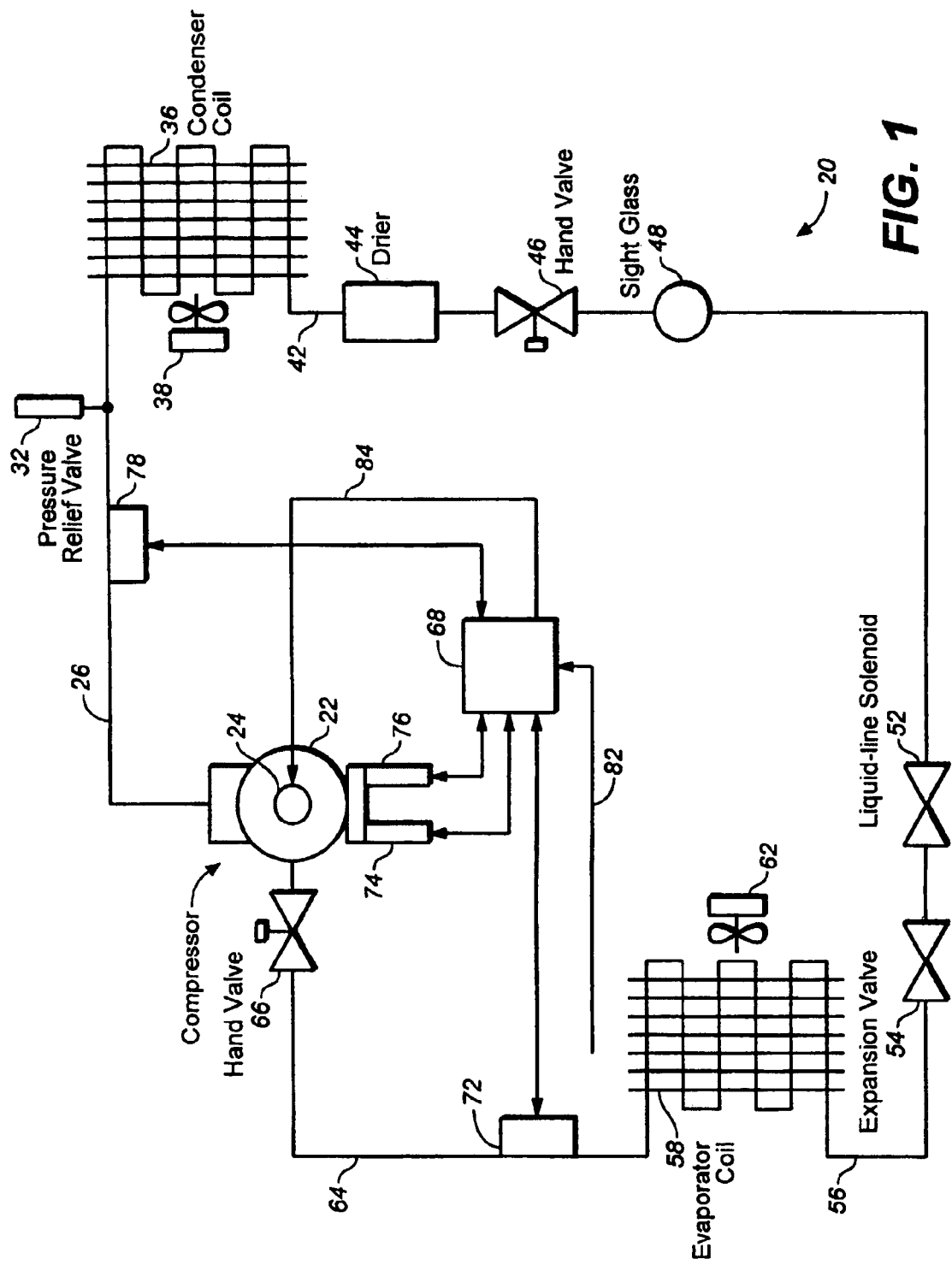
FIG. 1 is a block diagram illustrating a typical refrigeration or air conditioning system whose operation may be regulated by an intelligent controller.

Referring to FIG. 1, a typical conventional refrigeration or air conditioning system, referred to by the general reference character 20, includes a compressor 22 which is driven conventionally, either internally or externally, by an electric motor 24. A discharge outlet side of the compressor 22 connects with a compressor discharge line 26 of the system 20. Typically, the compressor discharge line 26 of a commercial system 20 may include a pressure relief valve 32. Via the compressor discharge line 26, hot gaseous refrigerant flows to a condenser coil 36. As outlined above, ambient air, either due to natural convection or driven by a fan 38, passes through the condenser coil 36 to cool the hot gaseous refrigerant in the condenser coil 36 so the refrigerant condenses to its liquid state. That liquid refrigerant flowing out of the condenser coil 36 via a liquid refrigerant line 42 passes sequentially through a drier 44, a manually operated valve 46, a sight glass 48, perhaps an optional liquid-line solenoid valve 52 and an expansion valve 54. As the refrigerant passes through the expansion valve 54, it returns to its gaseous state after which that gaseous and now cooler refrigerant flows through an expansion valve discharge line 56 to an evaporator coil 58. In a refrigeration or air conditioning system 20, the now cooler refrigerant flowing through the evaporator coil 58 chills ambient air passing through the evaporator coil 58 either by natural convection or driven by a fan 62. If the system 20 includes the liquid-line solenoid valve 52, operation of the liquid-line solenoid valve 52 is controlled either by a separate thermostatic switch which responds to the temperature of air after it passes through the evaporator coil 58, or by a separate manually operated switch. The evaporator coil 58 discharges the now warmer gaseous refrigerant to a compressor suction line 64 which connects to an intake side of the compressor 22. Typically, the compressor suction line 64 includes a manual valve 66. Configured in this way, refrigerant flowing through a closed-piping-loop provided by the system transfers heat from the ambient air passing through the evaporator coil 58 to the ambient air passing through the condenser coil 36.

In accordance with the present disclosure, a system 20 configured so its operation is regulated by an intelligent controller 68 may also include one or more of:

1. a suction-line gas-pressure sensor 72 connected to the compressor suction line 64;
2. a refrigeration compressor oil pump suction-line oil-pressure sensor 74 connected at the intake side of the compressor 22;
3. a refrigeration compressor oil pump discharge-line oil-pressure sensor 76 connected at the discharge outlet side of the compressor 22; and
4. a discharge-line gas-pressure sensor 78 connected to the compressor discharge line 26.

Preferably, the sensors 72, 74, 76 and 78 are selected from among 2CP5/2CP50 Series HVAC/Refrigeration Pressure Transducers marketed by Texas Instruments Incorporated of Attleboro, Mass. This particular type of pressure transducer includes a ceramic diaphragm one side of which is exposed to refrigerant or compressor oil. The other side of the ceramic diaphragm furthest from the refrigerant or compressor oil carries an electronic circuit. This electronic circuit receives electrical power and produces an output signal that indicates the pressure of the refrigerant or compressor oil at the ceramic diaphragm. The output signal produced by the transducer's electronic circuit is ratiometric to the supply voltage thereby preserving the output signal's accuracy despite variations in electrical power received by the transducer.

The intelligent controller 68 receives electrical power via a power line 82, and in accordance with the present disclosure, supplies electrical power to each of the sensors 72, 74, 76 and 78. Each of the sensors 72, 74, 76 and 78 then supplies its ratiometric output voltage to the intelligent controller 68. Each such ratiometric output voltage received by the intelligent controller 68 corresponds respectively to pressure at the individual sensors 72, 74, 76 and 78. The intelligent controller 68 processes these received voltages for regulating operation of the system 20 in accordance with pre-defined programmed pressure parameters, and a pre-defined defrost parameter. The intelligent controller 68 includes and, responsive to its processing of voltages received from the sensors 72, 74, 76 and 78, controls a relay whose operation effects energizing the motor 24 via a motor power line 84.

The intelligent controller 68 preferably includes a Phillips model P89LPC938 8-bit microcontroller included in a programmable electronic circuit for regulating operation of the system 20. The preferred microcontroller includes an 8-input multiplexed 10-bit analog to digital ("A/D") converter. As used in the intelligent controller 68, four (4) of the eight (8) A/D inputs provide four (4) independent input channels which respectively received output signals from those of the sensors 72, 74, 76 and 78 included in the system 20. The preferred microcontroller also includes erasable Flash memory for storing a computer program, and an electrically erasable programmable read only memory ("EEPROM") for data storage. These memories are used for storing both a computer program and programming data for regulating operation of the system 20.

The intelligent controller 68 includes a full-wave bridge rectifier that is capacitively coupled to an alternating current ("AC") power source. A voltage regulator, which receives direct current ("DC") power output from full-wave bridge rectifier, supplies voltage regulated DC electrical power for energizing operation of the microcontroller and the sensors 72, 74, 76 and 78.

The intelligent controller 68 can be configured to regulate the operation of a refrigeration or air conditioning system 20 wherever a low, high or oil differential pressure control is normally be used. In this way, the intelligent controller 68 is adapted for regulating the operation of refrigeration compressors, condenser systems, air conditioning compressors and complete air conditioning units. The intelligent controller 68 provides this adaptability through selectable, stored operating pressure parameters that permit precise ON/OFF points for regulating the operation of systems 20 attached to the intelligent controller 68.

Before being placed in service, the intelligent controller 68 must be programmed for regulating operation of the system 20. Depending upon manufacturing details, the intelligent controller 68 can regulate operation of a system 20 in one or more of the following three (3) ways.

i) Refrigerant Low Pressure On/Off Control
  ii) Refrigerant High Pressure Off Control
  iii) Refrigeration Compressor Oil Pressure Differential Control As summarized in greater details below, manufacturing details enable a particular intelligent controller 68 for operating in the three (3) following modes for regulating operation of the system 20.

1) General Purpose Controller ("GPC") that is capable of performing only one (1) of the preceding ways for regulating the operation of a system 20, i.e.
     i) Refrigerant Low Pressure On/Off Control
     ii) Refrigerant High Pressure Off Control
     iii) Refrigeration Compressor Oil Pressure Differential Control 2) Dual Purpose Controller ("DPC") that is capable of concurrently performing any two (2) of the preceding ways for regulating the operation of a system 20, i.e.
     i) Refrigerant Low Pressure On/Off Control and Refrigerant High Pressure Off Control
     ii) Refrigerant High Pressure Off Control and Refrigeration Compressor Oil Pressure Differential Control
     iii) Refrigerant Low Pressure On/Off Control and Refrigeration Compressor Oil Pressure Differential Control
     The DPC may also be configured to perform only one (1) of the preceding ways for regulating the operation of a system 20, i.e. the DPC may be configured to operate the same as the GPC.

3) Triple Purpose Controller ("TPC") that is capable of concurrently performing all three (3) of the preceding ways for regulating the operation of a system 20, i.e. Refrigerant Low Pressure On/Off Control and Refrigerant High Pressure Off Control and Refrigeration Compressor Oil Pressure Differential Control.
     The TPC may also be configured to perform:
     i) only one (1) of the preceding ways for regulating the operation of a system 20, i.e. the TPC may be configured to operate the same as the GPC; or
     ii) any two (2) of the preceding ways for regulating the operation of a system 20, i.e. the TPC may be configured to operate the same as the DPC.

In addition to the three (3) ways described above for regulating operation of the intelligent controller 68, the intelligent controller 68 may also be programmed to periodically provide a defrost cycle. Defrost cycle programming permits up to six (6) defrost cycles during each day, with each defrost cycle lasting for 1 to 59 minutes. If the system 20 includes a defrost heater, defrost cycle programming also permits operating a second relay for energizing the defrost heater during the defrost cycle.

The intelligent controller 68 is programmed for regulating operation of the intelligent controller 68 using a set-up-tool ("SUT"). The SUT is a small hand-held terminal which in one embodiment connects by a cable to the intelligent controller 68 to allow programming the intelligent controller 68. When connected to a intelligent controller 68, a display included in the SUT presents a user with a brief series of questions and selectable values. Keys included in the SUT permits a user to enter responses to these SUT prompts. After the user responds to the SUT prompts the intelligent controller 68 becomes capable of operating as a fully-functional, running intelligent controller 68. The same SUT will configure all three (3) different types of intelligent controller 68, i.e. the GPC, DPC or the TPC, without limitation. After the intelligent controller 68 has been programmed, the SUT, which is not required during normal operation of the intelligent controller 68, may be disconnected. All functions that may be performed by a previously programmed intelligent controller 68 may be reprogrammed by re-connecting the SUT thereto. The SUT, which uses the same PCB as the intelligent controller 68 is not depicted in any of the FIGs., and is configured to function as the SUT by installing a jumper on the PCB.

The SUT preferably includes the following keys that are used in responding to prompts.
  MENU—Menu Key, press this key any time you want to enter the configuration mode. You can also press this key during configuration to go to the beginning.
  YES—Yes Key, press this key to answer 'yes'
  NO—No Key, press this key to answer 'no'
  ENTER—Enter Key, press this key if the displayed numeric value is what you want to set Up Arrow—pressing this key increments the number shown by 0.1 psia.

Down Arrow—pressing this key decrements the number shown by 0.1 psia.

Right Arrow—pressing this key increments the number shown by 10 psia for the refrigerant settings, and by 5 psia for the oil settings.

Left Arrow—pressing this key decrements the number shown by 10 psia for the refrigerant settings, and by 5 psia for the oil settings.

Note that all the keys are self-repeating. Holding the arrows keys down automatically changes the numeric values up to the maximum allowed value or down to the minimum allowed.

After a intelligent controller 68 is configured using the SUT, it initially performs a calibration operation before it begins regulating operation of the system 20. The calibration operation measures at ambient atmospheric pressure output signals received from each of the sensors 72, 74, 76 and 78 as may be included in the system 20, and stores as an offset the measured value of each output signal received from the sensors 72, 74, 76 and 78. Subsequently, these stored offsets are applied in adjusting output signal values received from each of the sensors 72, 74, 76 and 78 during normal operation of the system 20. The offsets eliminate errors caused by manufacturing variations or tolerances in the sensors 72, 74, 76 and 78, variations in measurement electronics of the intelligent controller 68, and any difference in ambient air pressure arising from the location of the system 20.

Sensor calibration must be performed with the actual pressure sensors 72, 74, 76 and 78 that will be installed in the system 20 connected to the intelligent controller 68. The calibration operation must be performed with all the sensors 72, 74, 76 and 78 at ambient atmospheric pressure to establish the output signal from the sensors 72, 74, 76 and 78 which corresponds to 0 psia. Consequently, the sensors 72, 74, 76 and 78 must either be removed from the system 20 during calibration, or the system 20 must be open to atmospheric pressure.

The intelligent controller 68 cannot detect when or if a sensors 72, 74, 76 and 78 has been replaced. It is an installer's responsibility to ensure that the calibration operation is repeated after changing or repairing any one of the sensors 72, 74, 76 and 78. Furthermore, if programming of the intelligent controller 68 changes, the intelligent controller 68 prompts the user to repeat the calibration operation.

As described above, the intelligent controller 68 is capable of regulating the operation of the system 20 in three different ways.

i) Refrigerant Low Pressure On/Off Control

When the intelligent controller 68 functioning as a GPC controls the operation of the system 20 only in this particular way, the suction-line gas-pressure sensor 72 connects to input channel 1 of the intelligent controller 68, and the other three (3) input channels are unused. During configuration using the SUT, a user selects an ON Pressure Set-point and an OFF Pressure Set-point. Setting these set-points programs the intelligent controller 68 for energizing operation of the motor 24 when the refrigerant pressure in the compressor suction line 64 rises above the ON Pressure Set-point. As the system 20 begins operating the refrigerant pressure in the compressor suction line 64 begins decreasing. When the refrigerant pressure in the compressor suction line 64 becomes less than the OFF Pressure Set-point, the intelligent controller 68 turns the motor 24 off. Programming a value for the ON Pressure Set-point which is less than the OFF Pressure Set-point establishes hysteresis for operation of the system 20.

ii) Refrigerant High Pressure OFF Control

When the intelligent controller 68 functioning as a GPC controls the operation of the system 20 only in this particular way, the discharge-line gas-pressure sensor 78 connects to input channel 2 of the intelligent controller 68, and the other three (3) input channels are unused. During configuration using the SUT, a user selects a High Pressure OFF Set-point. Setting this set-point programs the intelligent controller 68 for energizing operation of the motor 24 when the refrigerant pressure in the compressor discharge line 26 is below the High Pressure OFF Set-point. If the refrigerant pressure in the compressor discharge line 26 exceeds the High Pressure OFF Set-point, the intelligent controller 68 turns the motor 24 off and the intelligent controller 68 enters an ALARM state. In the ALARM state, red and yellow lights included in the intelligent controller 68 flash together and operation of the motor 24 will not be energized until a user depresses a RESET switch included in the intelligent controller 68. After a user depresses the RESET switch, if refrigerant pressure in the compressor discharge line 26 is below the High Pressure OFF Set-point after a few seconds the intelligent controller 68 will again energize operation of the motor 24. If after the RESET switch has been depressed refrigerant pressure in the compressor discharge line 26 still exceeds the High Pressure OFF Set-point, the intelligent controller 68 does not energize operation of the motor 24, and after a few seconds the intelligent controller 68 re-enters the ALARM state.

iii) Oil Pressure Differential Limit Control

When the intelligent controller 68 functioning as a GPC controls the operation of the system 20 only in this particular way, the suction-line oil-pressure sensor 74 connects to input channel 3 of the intelligent controller 68, the discharge-line oil-pressure sensor 76 connects to input channel 4 and the other two (2) input channels are unused. During configuration using the SUT, a user selects an Oil Pressure Differential OFF Set-point. The Oil Pressure Differential OFF Set-point specifies a difference between pressures respectively sensed by the sensors 74 and 76. Setting these set-points programs the intelligent controller 68 for energizing operation of the motor 24 when the difference between pressures respectively sensed by the sensors 74 and 76 is not below the Oil Pressure Differential OFF Set-point. If the difference between pressures respectively sensed by the sensors 74 and 76 drops below the Oil Pressure Differential OFF Set-point, the intelligent controller 68 turns the motor 24 off and the intelligent controller 68 enters the ALARM state. As described previously, in the ALARM state, the red and yellow lights flash together and operation of the motor 24 will not be energized until a user depresses the RESET switch. After a user depresses the RESET switch, if the difference between pressures respectively sensed by the sensors 74 and 76 exceeds the Oil Pressure Differential OFF Set-point, after a few seconds the intelligent controller 68 energizes operation of the motor 24. If after operation of the motor 24 has been energized the difference between pressures respectively sensed by the sensors 74 and 76 remains below the Oil Pressure Differential OFF Set-point, the intelligent controller 68 again turns the motor 24 off and the intelligent controller 68 re-enters the ALARM state.

Whether starting the system 20 normally or after resetting an ALARM state, operation of the intelligent controller 68 provides a seventy-five (75) second interval during which the motor 24 is energized before the intelligent controller 68 processes signals from the sensors 72, 74, 76 and 78 to determine whether the system 20 has resumed operating within the parameter(s) programmed into the intelligent controller 68. This seventy-five (75) second interval allows the system 20 to stabilize and allow compressor oil to circulate properly thereby avoiding spuriously entering the ALARM state.

Special Manual Override Mode

All three types of the intelligent controller 68, i.e. the GPC, DPC and the TPC, implement a special Manual Override Mode. When the intelligent controller 68 operates in the special Manual Override Mode it energizes operation of the motor 24 for approximately ninety (90) seconds regardless of the output voltage received from any of the sensors 72, 74, 76 and 78. The special Manual Override Mode is used for testing electrical connections to the system 20, or to operate it manually for a short interval of time. None of the three (3) ways in which the the intelligent controller 68 regulates operation of a system 20, i.e. i), ii) or iii) described above, are active when the the intelligent controller 68 is operating in its special Manual Override Mode.

To initiate operation in the special Manual Override Mode the user presses and holds a Manual Override Switch included in the intelligent controller 68, and then momentarily presses and releases the Reset Switch. After several seconds the intelligent controller 68 energizes operation of the motor 24 and he user may then release the Manual Override Switch.

When operating in the special Manual Override mode, the yellow light stays steadily on and the red light blinks slowly. After approximately ninety (90) seconds the intelligent controller 68 de-energizes operation of the motor 24. After the intelligent controller 68 de-energizes operation of the motor 24 it performs a reset and reverts to normal operation.

Figure 2:
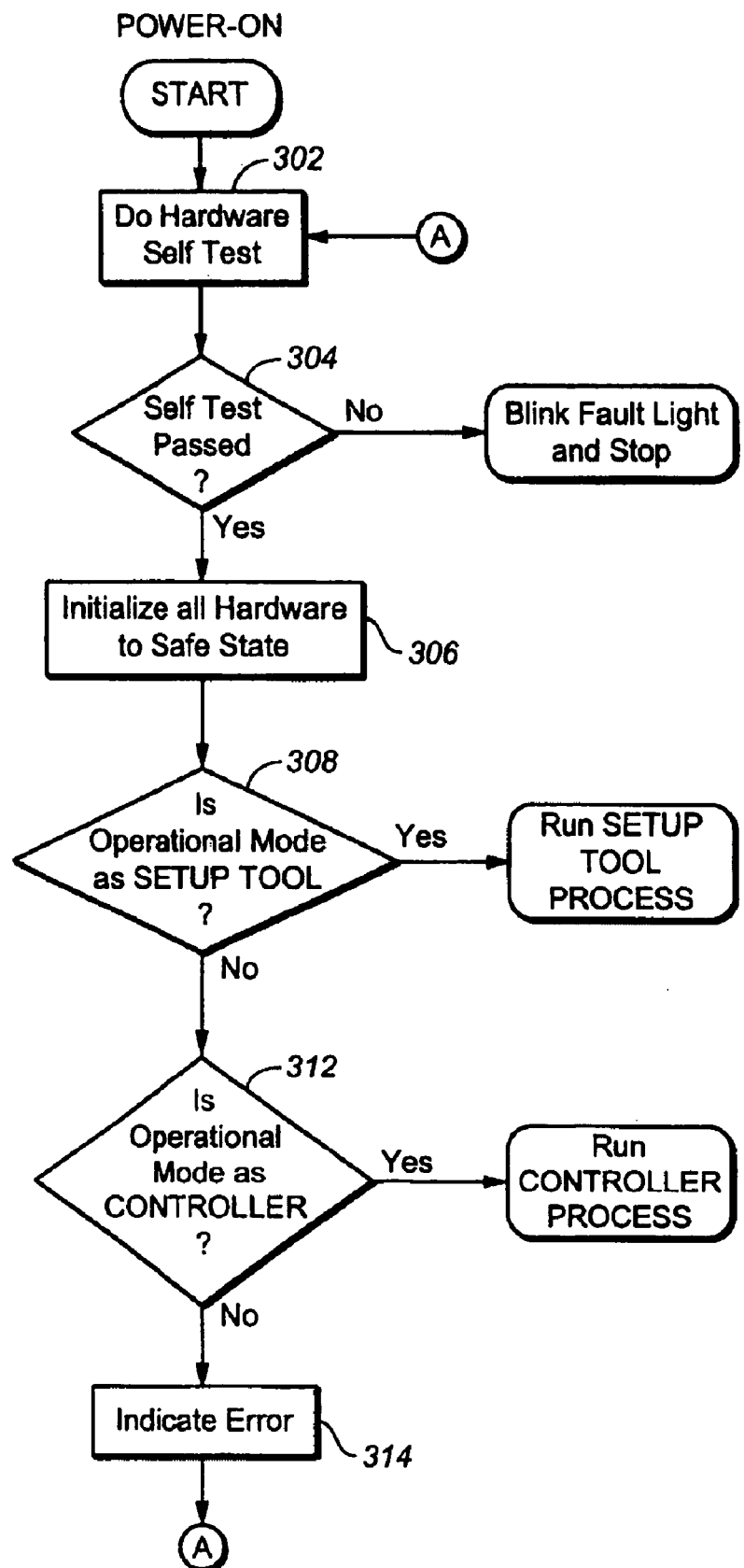
FIG. 2 is a decisional flow chart depicting a sequence of operations performed after electrical power is first applied to a printed circuit board ("PCB") included in the intelligent controller.

The decisional flow chart of FIG. 2 illustrates a sequence of operations executed immediately upon applying electrical power to the microcontroller included in a PCB that is adapted for inclusion in the intelligent controller 68, or as previously explained for inclusion in the SUT. In processing block 302 the computer program executed by the microcontroller performs a hardware self test. In decision block 304 the computer program determines if the hardware is functioning properly. If the hardware is not functioning properly, the computer program executed by the microcontroller causes a fault light to blink and stops the computer program's execution. If the hardware is functioning properly, the computer program executed by the microcontroller in processing block 306 initializes all hardware to a safe state. After the hardware has been initialized to a safe state, the computer program executed by the microcontroller in decision block 308 determines whether a jumper on the PCB indicates that the PCB is installed in the SUT. If the jumper on the PCB indicates that the PCB is installed in the SUT, then the computer program executed by the microcontroller starts a Set-Up-Tool Process illustrated in FIG. 3. If the jumper on the PCB indicates that the PCB is not installed in the SUT, then the computer program executed by the microcontroller in decision block 312 determines whether a jumper on the PCB indicates that the PCB is installed in the intelligent controller 68. If the jumper on the PCB indicates that the PCB is installed in the intelligent controller 68, then the computer program executed by the microcontroller starts the Controller Process illustrated in FIGS. 4A and 4B. If the jumper on the PCB indicates that the PCB is not installed in the intelligent controller 68, then the computer program executed by the microcontroller in processing block 314 indicates that an error has occurred, and returns to processing block 302.

Figure 3:
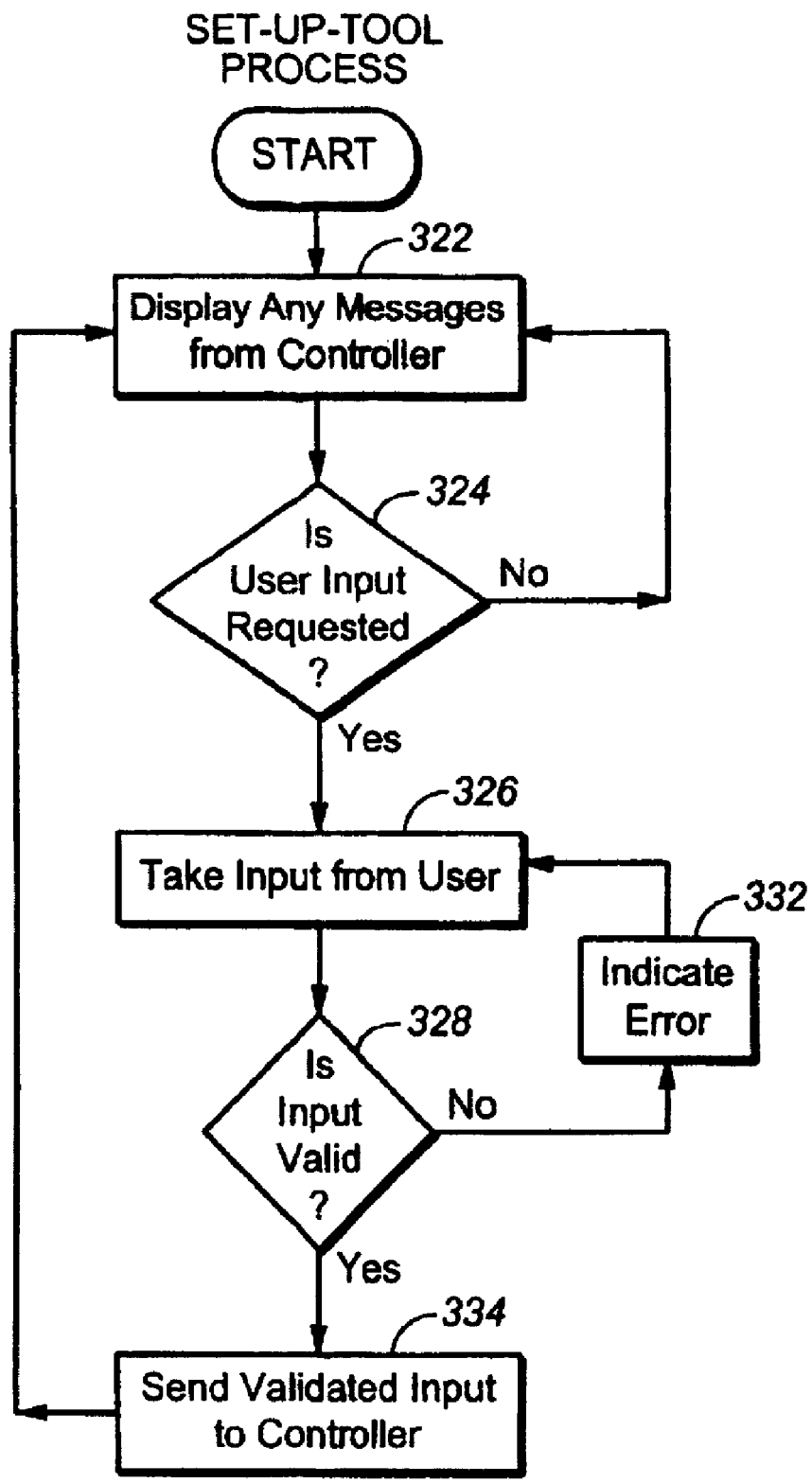
FIG. 3 is a decisional flow chart depicting a sequence of operations performed by a set-up-tool which communicates with the intelligent controller in programming the intelligent controller for regulating operation of the typical refrigeration or air conditioning system illustrated in FIG. 1.

The decisional flow chart of FIG. 3 illustrates the Set-Up-Tool Process executed by a microcontroller included in the SUT which communicates with the intelligent controller 68 in programming the intelligent controller 68 for regulating operation of the typical refrigeration or air conditioning system 20 illustrated in FIG. 1. Initially the Set-Up-Tool Process in processing block 322 displays any message which the SUT receives from the intelligent controller 68. After displaying any messages which the SUT has received from the intelligent controller 68, the Set-Up-Tool Process then determines in decision block 324 whether any user input is being requested. If the Set-Up-Tool Process determines that no user input is being requested, the process returns to processing block 322. If the Set-Up-Tool Process determines that user input has been requested, then in processing block 326 the Set-Up-Tool Process accepts input entered by the user using the SUT's keys. After accepting input from the user, the Set-Up-Tool Process determines whether the input is valid in decision block 328. If the input received by the Set-Up-Tool Process is invalid, the SUT in processing block 332 indicates that an error has occurred, and then returns to processing block 326 so the user can re-enter the input. If the input received by the Set-Up-Tool Process is valid, the SUT in processing block 334 transmits the valid programming input to the microcontroller included in the intelligent controller 68, and then returns to decision block 312 to display any message which the SUT receives from the intelligent controller 68.

Figure 4A:
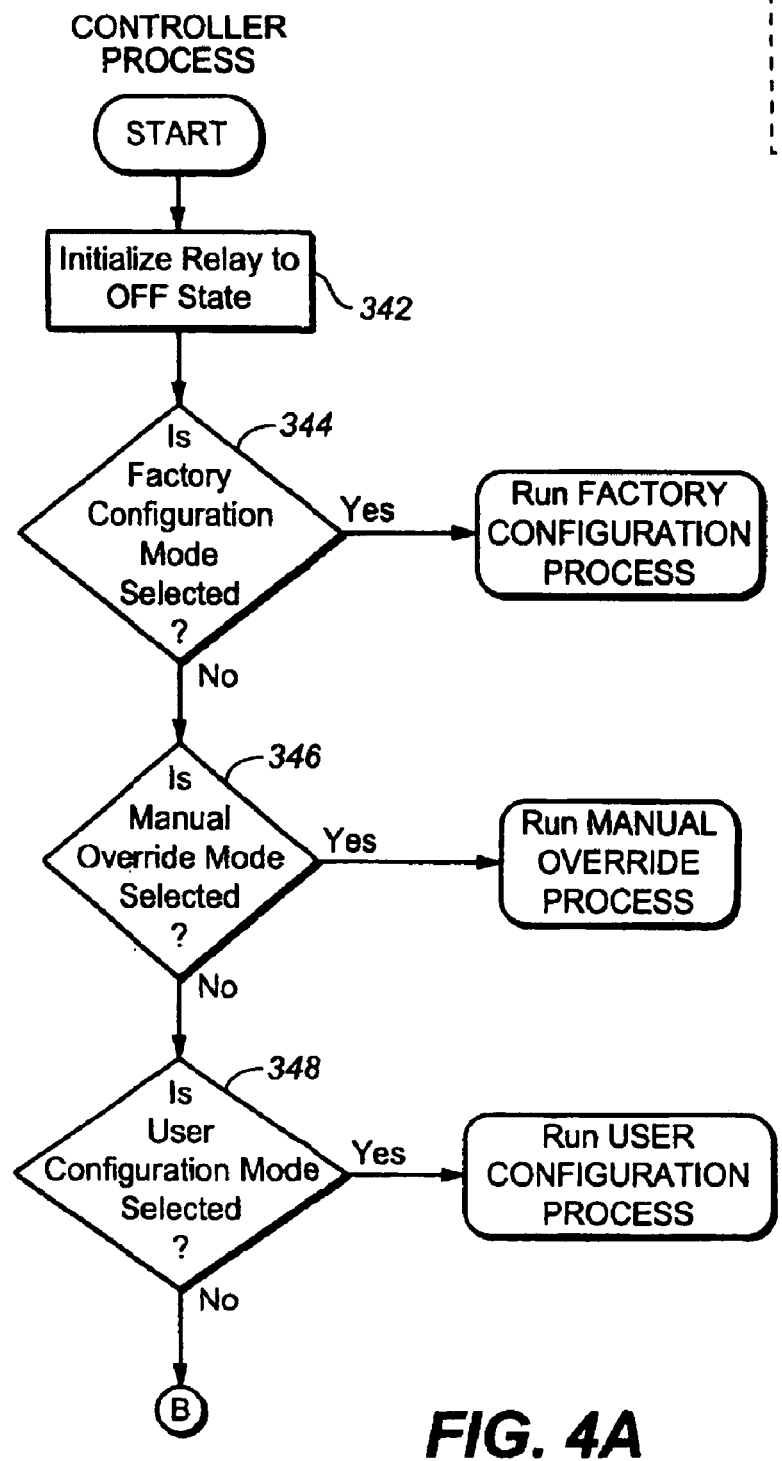
FIG. 4 depicts the relationship between FIGS. 4A and 4B, the combined FIGS. 4A and 4B forming a decisional flow chart depicting a sequence of operations performed by the intelligent controller before the intelligent controller executes a normal control process for regulating operation of the typical refrigeration or air conditioning system illustrated in FIG. 1.
Figure 4B:
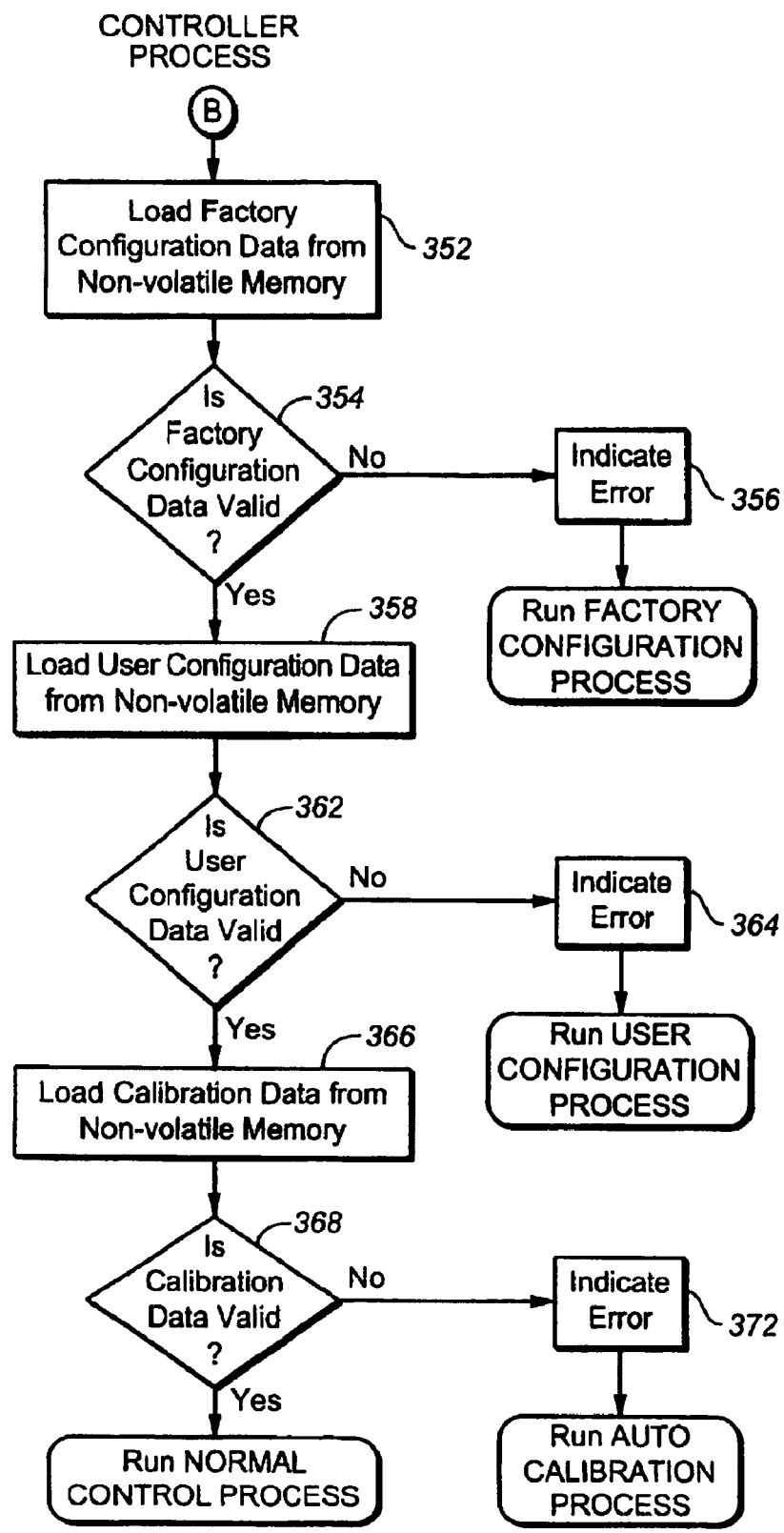
Figure 7:
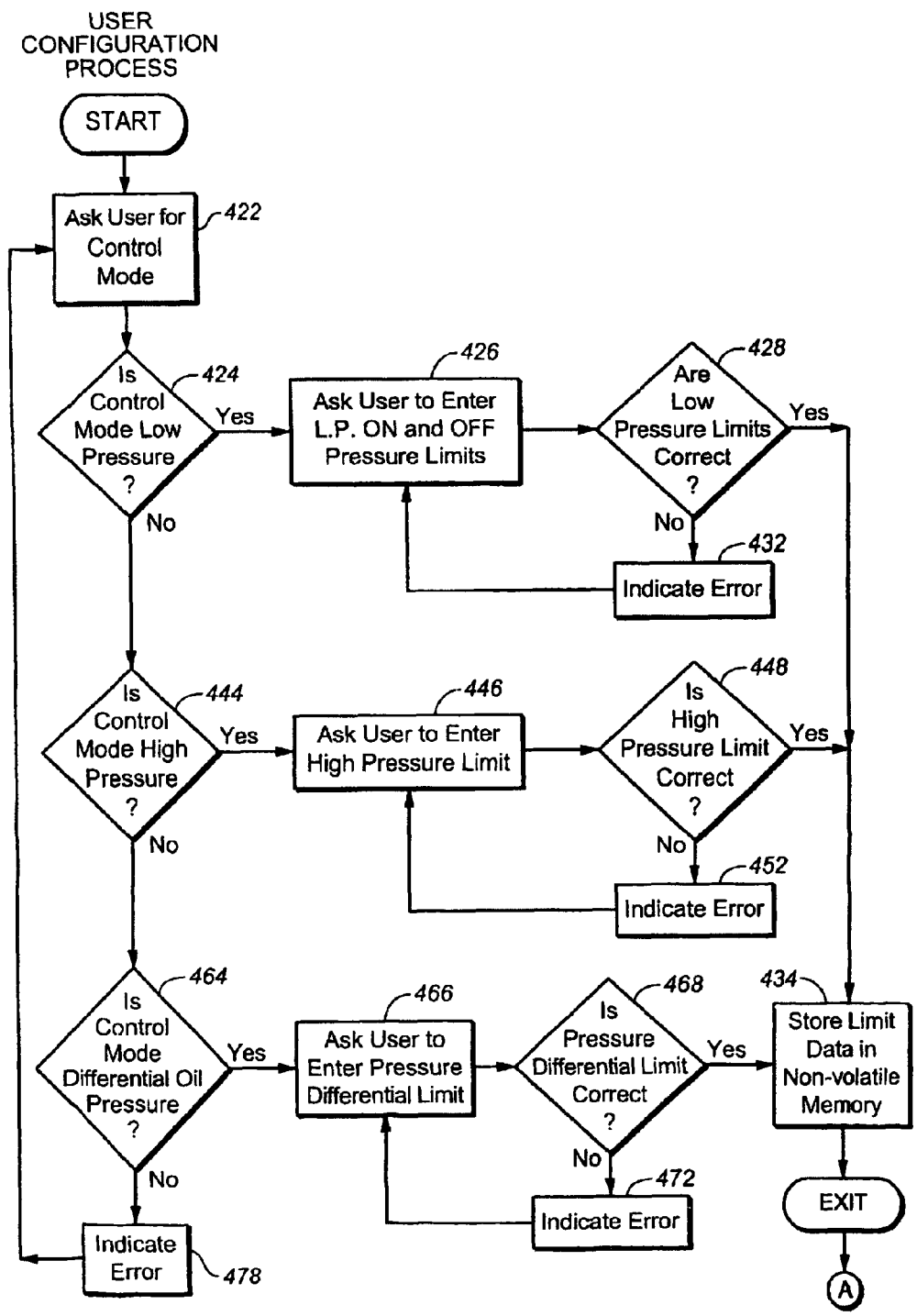
FIG. 7 is a decisional flow chart depicting a sequence of operations performed during user configuration of the intelligent controller for regulating operation of the typical refrigeration or air conditioning system illustrated in FIG. 1.
Figure 8:
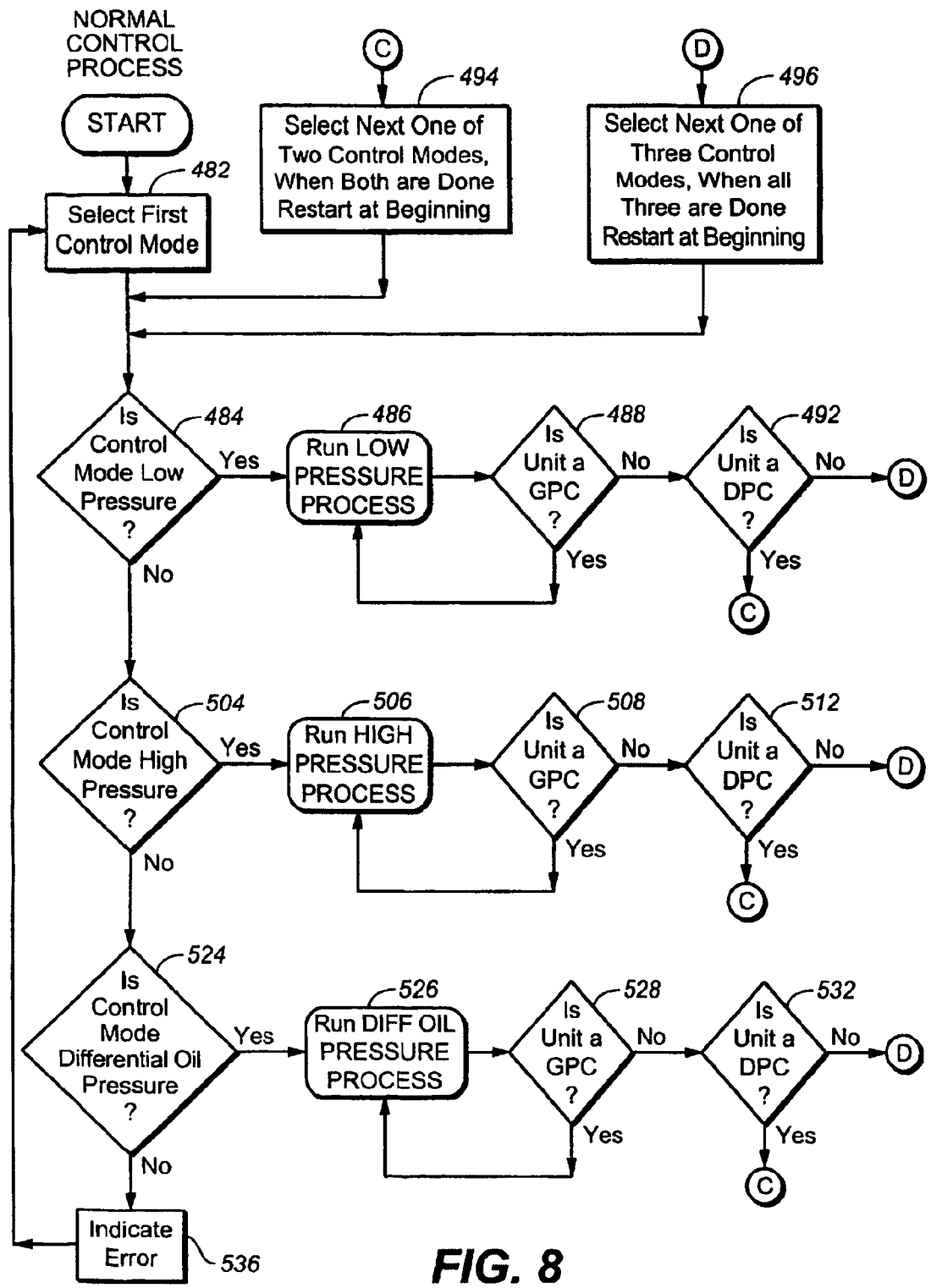
FIG. 8 is a decisional flow chart depicting a sequence of operations executed by the intelligent controller during normal control of the typical refrigeration or air conditioning system illustrated in FIG. 1.

The decisional flow chart formed by the combined FIGS. 4A and 4B illustrates the Controller Process executed by the microcontroller included in the intelligent controller 68 before it executes a Normal Control Process, illustrated in FIG. 8, for regulating operation of the typical refrigeration or air conditioning system 20 illustrated in FIG. 1. Initially the Controller Process in processing block 342 initializes the relay included in the intelligent controller 68 to its off state thereby de-energizing operation of the motor 24. After de-energizing operation of the motor 24, the Controller Process in decision block 344 determines whether the intelligent controller 68 is operating in a Factory Configuration Mode. If the intelligent controller 68 is operating in the Factory Configuration Mode, then the microcontroller included in the intelligent controller 68 starts a Factory Configuration Process illustrated in FIG. 5. If the intelligent controller 68 is not operating in the Factory Configuration Mode, then the Controller Process in decision block 346 determines whether the intelligent controller 68 is operating in a Special Manual Override Mode. If the intelligent controller 68 is operating in the Special Manual Override Mode, then the microcontroller included in the intelligent controller 68 starts a Manual Override Process illustrated in FIG. 6. If the intelligent controller 68 is not operating in the Special Manual Override Mode, then the Controller Process in decision block 348 determines whether the intelligent controller 68 is operating in a User Configuration Mode. If the intelligent controller 68 is operating in the User Configuration Mode, then the microcontroller included in the intelligent controller 68 starts a User Configuration Process illustrated in FIG. 7.

If the intelligent controller 68 is not operating in the User configuration Mode, then the Controller Process in processing block 352 loads factory configuration data from a non-volatile memory included in the preferred microcontroller. After loading the factory configuration data, the Controller Process in decision block 354 determines whether the factory configuration data is valid. If the factory configuration data is invalid, the Controller Process in processing block 356 indicates that an error has occurred, and then the microcontroller included in the intelligent controller 68 starts the Factory Configuration Process illustrated in FIG. 5. If the factory configuration data is valid, the Controller Process in processing block 358 loads user configuration data from the non-volatile memory included in the preferred microcontroller. After loading the user configuration data, the Controller Process in decision block 362 determines whether the user configuration data is valid. If the user configuration data is invalid, the Controller Process in processing block 364 indicates that an error has occurred, and then the microcontroller included in the intelligent controller 68 starts the User Configuration Process illustrated in FIG. 7. If the user configuration data is valid, the Controller Process in processing block 366 loads calibration data from the non-volatile memory included in the preferred microcontroller. After loading the calibration data, the Controller Process in decision block 368 determines whether the calibration data is valid. If the calibration data is invalid, the Controller Process in processing block 372 indicates that an error has occurred, and then the microcontroller included in the intelligent controller 68 starts an Auto Calibration Process illustrated in FIG. 12. If the calibration data is valid, the Controller Process then invokes a Normal Control Process illustrated in FIG. 8.

The decisional flow chart of FIG. 5 illustrates a sequence of operations performed during configuration of the intelligent controller 68 while it is being manufactured. Initially the Factory Configuration Process in processing block 382 directs an operator to enter factory configuration data. After the operator has entered the factory configuration data, the Factory Configuration Process then determines in decision block 384 whether the factory configuration data is valid. If the factory configuration data is invalid, the Factory Configuration Process in processing block 386 indicates that an error has occurred, and then returns to processing block 382 so the operator can re-enter the factory configuration data. If the factory configuration data is valid, the Factory Configuration Process in processing block 388 stores the factory configuration data into the non-volatile memory included in the preferred microcontroller of the intelligent controller 68, and exits the Factory Configuration Process to processing block 302 in FIG. 2.

The decisional flow chart of FIG. 6 illustrates the Manual Override Process performed by the microcontroller of the intelligent controller 68. Initially the Manual Override Process in processing block 402 turns the relay included in the intelligent controller 68 to its on state thereby energizing operation of the motor 24. The Manual Override Process in processing block 404 starts a ninety (90) second timer after which the Manual Override Process in processing block 406 toggles a light emitting diode ("LED") either from off to on, or from on to off. Then the Manual Override Process determines in decision block 408 if the ninety (90) second timer has expired. If the ninety (90) second timer has not expired, the Manual Override Process returns to processing block 406. If the ninety (90) second timer has expired, the Manual Override Process in processing block 412 then turns the relay included in the intelligent controller 68 to its off state thereby de-energizing operation of the motor 24, and exits the Manual Override Process to processing block 302 in FIG. 2.

The decisional flow chart of FIG. 7 illustrates the User Configuration Process executed by the microcontroller included in the intelligent controller 68 while the SUT is concurrently executing the Set-Up-Tool Process illustrated in FIG. 3 to program the intelligent controller 68 for regulating operation of the typical refrigeration or air conditioning system 20 illustrated in FIG. 1. Initially, the User Configuration Process in processing block 422 sends a message to the SUT asking the user to specify a control mode for the intelligent controller 68. Then the User Configuration Process in decision block 424 determines if the control mode received from the SUT is that for Refrigerant Low Pressure On/Off Control. If the control mode received from the SUT is that for Refrigerant Low Pressure On/Off Control, then the User Configuration Process in processing block 426 sends a message to the SUT asking the user to select the ON Pressure Set-point and the OFF Pressure Set-point. After receiving the ON Pressure Set-point and the OFF Pressure Set-point from the SUT, the User Configuration Process in decision block 428 determines if the received ON Pressure Set-point and OFF Pressure Set-point are valid. If the received ON Pressure Set-point and OFF Pressure Set-point are invalid, the User Configuration Process in processing block 432 sends a message to the SUT indicating that the received ON Pressure Set-point and OFF Pressure Set-point are invalid, and returns to processing block 426. If the received ON Pressure Set-point and OFF Pressure Set-point are valid, the User Configuration Process proceeds to processing block 434 where the valid ON Pressure Set-point and OFF Pressure Set-point are stored into the non-volatile memory included in the preferred microcontroller, and exits the User Configuration Process to processing block 302 in FIG. 2.

If in decision block 424 the User Configuration Process determines that the control mode received from the SUT is not that for Refrigerant Low Pressure On/Off Control, the User Configuration Process proceeds to decision block 444 to determine if the control mode received from the SUT is that for Refrigerant High Pressure OFF Control. If the control mode received from the SUT is that for Refrigerant High Pressure OFF Control, then the User Configuration Process in processing block 446 sends a message to the SUT asking the user to select the High Pressure OFF Set-point. After receiving the High Pressure OFF Set-point from the SUT, the User Configuration Process in decision block 448 determines if the received High Pressure OFF Set-point is valid. If the received High Pressure OFF Set-point is invalid, the User Configuration Process in processing block 452 sends a message to the SUT indicating that the received High Pressure OFF Set-point is invalid, and returns to processing block 446. If the received High Pressure OFF Set-point is valid, the User Configuration Process proceeds to processing block 434 where the valid High Pressure OFF Set-point is stored into the non-volatile memory included in the preferred microcontroller, and exits the User Configuration Process to processing block 302 in FIG. 2.

If in decision block 444 the User Configuration Process determines that the control mode received from the SUT is not that for Refrigerant High Pressure OFF Control, the User Configuration Process proceeds to decision block 464 to determine if the control mode received from the SUT is that for Oil Pressure Differential Limit Control. If the control mode received from the SUT is that for Oil Pressure Differential Limit Control, then the User Configuration Process in processing block 466 sends a message to the SUT asking the user to select the Oil Pressure Differential OFF Set-point. After receiving the Oil Pressure Differential OFF Set-point from the SUT, the User Configuration Process in decision block 468 determines if the received Oil Pressure Differential OFF Set-point is valid. If the received Oil Pressure Differential OFF Set-point is invalid, the User Configuration Process in processing block 472 sends a message to the SUT indicating that the received Oil Pressure Differential OFF Set-point is invalid, and returns to processing block 466. If the received Oil Pressure Differential OFF Set-point is valid, the User Configuration Process proceeds to processing block 434 where the valid Oil Pressure Differential OFF Set-point is stored into the non-volatile memory included in the preferred microcontroller, and exits the User Configuration Process to processing block 302 in FIG. 2.

If in processing block 446 the User Configuration Process determines that the control mode received from the SUT is not that for Oil Pressure Differential Limit Control, the User Configuration Process proceeds to processing block 478 and sends a message to the SUT indicating that an error has occurred in specifying a control mode for the intelligent controller 68 and the User Configuration Process returns to processing block 422.

The decisional flow chart of FIG. 8 illustrates the Normal Control Process executed by the microcontroller included in the intelligent controller 68 during regulation of the typical refrigeration or air conditioning system 20 illustrated in FIG. 1. Initially, the Normal Control Process in processing block 482 selects a first control mode from among the three (3) modes described above for regulating operation of the system 20. Having selected a first control mode, the Normal Control Process in decision block 484 determines if the intelligent controller 68 is to perform Refrigerant Low Pressure On/Off Control in regulating operation of the system 20. If the intelligent controller 68 is to perform Refrigerant Low Pressure On/Off Control in regulating operation of the system 20, the Normal Control Process block 486 starts execution of a Low Pressure Process illustrated in FIG. 9. After the Low Pressure Process completes, the Normal Control Process in decision block 488 determines if the intelligent controller 68 was manufactured as a GPC. If the intelligent controller 68 was manufactured as a GPC, then, because it capable of performing only one (1) way of regulating operation of the system 20, the Normal Control Process returns to block 486. If the intelligent controller 68 was not manufactured as a GPC, the Normal Control Process in decision block 492 determines if the intelligent controller 68 was manufactured as a DPC. If the intelligent controller 68 was manufactured as a DPC, then the Normal Control Process in processing block 494 selects the next one of two (2) remaining modes in which the intelligent controller 68 regulates operation of the system 20. After the Normal Control Process selects the next mode in processing block 494, execution of the Normal Control Process returns to decision block 484. If the intelligent controller 68 was not manufactured as a DPC, then, because the intelligent controller 68 must have been manufactured as a TPC, the Normal Control Process in processing block 496 selects the next one of the remaining modes in which the intelligent controller 68 regulates operation of the system 20. After the Normal Control Process selects the next mode in processing block 496, execution of the Normal Control Process returns to decision block 484.

Because the mode for regulating operation of the system 20 is not the Refrigerant Low Pressure On/Off Control, the Normal Control Process passes through decision block 484 and proceeds to decision block 504 to determine if the intelligent controller 68 is to perform Refrigerant High Pressure Off Control. If the intelligent controller 68 is to perform Refrigerant High Pressure Off Control, the Normal Control Process block 506 starts execution of a High Pressure Process illustrated in FIG. 10. After the High Pressure Process completes, the Normal Control Process in decision block 508 determines if the intelligent controller 68 was manufactured as a GPC. If the intelligent controller 68 was manufactured as a GPC, then, because it capable of performing only one (1) way of regulating operation of the system 20, the Normal Control Process returns to block 506. If the intelligent controller 68 was not manufactured as a GPC, the Normal Control Process in decision block 512 determines if the intelligent controller 68 was manufactured as a DPC. If the intelligent controller 68 was manufactured as a DPC, then the Normal Control Process in processing block 494 selects the next one of the two (2) remaining modes in which the intelligent controller 68 regulates operation of the system 20. After the Normal Control Process selects the next mode in processing block 494, execution of the Normal Control Process returns to decision block 484. If the intelligent controller 68 was not manufactured as a DPC, then, because the intelligent controller 68 must have been manufactured as a TPC, the Normal Control Process in processing block 496 selects the next one of the remaining modes in which the intelligent controller 68 regulates operation of the system 20. After the Normal Control Process selects the next mode in processing block 496, execution of the Normal Control Process returns to decision block 484.

Because the mode for regulating operation of the system 20 is not the Refrigerant Low Pressure On/Off Control and is not the Refrigerant High Pressure Off Control, the Normal Control Process passes through decision block 484 and decision block 504, and proceeds to decision block 524 to determine if the intelligent controller 68 is to perform Refrigeration Compressor Oil Pressure Differential Control. If the intelligent controller 68 is to perform Refrigeration Compressor Oil Pressure Differential Control, the Normal Control Process block 526 starts execution of a Differential Oil Pressure Process illustrated in FIG. 11. After the Differential Oil Pressure Process completes, the Normal Control Process in decision block 528 determines if the intelligent controller 68 was manufactured as a GPC. If the intelligent controller 68 was manufactured as a GPC, then, because it capable of performing only one (1) way of regulating operation of the system 20, the Normal Control Process returns to block 526. If the intelligent controller 68 was not manufactured as a GPC, the Normal Control Process in decision block 532 determines if the intelligent controller 68 was manufactured as a DPC. If the intelligent controller 68 was manufactured as a DPC, then the Normal Control Process in processing block 494 selects the next one of the two (2) remaining modes in which the intelligent controller 68 regulates operation of the system 20. After the Normal Control Process selects the next mode in processing block 494, execution of the Normal Control Process returns to decision block 484. If the intelligent controller 68 was not manufactured as a DPC, then, because the intelligent controller 68 must have been manufactured as a TPC, the Normal Control Process in processing block 496 selects the next one of the remaining modes in which the intelligent controller 68 regulates operation of the system 20. After the Normal Control Process selects the next mode in processing block 496, execution of the Normal Control Process returns to decision block 484.

After the Normal Control Process selects the next mode either in processing block 494 or in processing block 496, and has respectively completed performing either two (2) or all three (3) control modes, the Normal Control Process returns to processing block 482.

If mode for regulating operation of the system 20 is not the Refrigerant Low Pressure On/Off Control, is not the Refrigerant High Pressure Off Control and is not the Refrigeration Compressor Oil Pressure Differential Control, the Normal Control Process passes through decision block 484, decision block 504 and decision block 524, and proceeds to processing block 536 to indicate that an error has occurred, and then returns to processing block 482.

Figure 9:
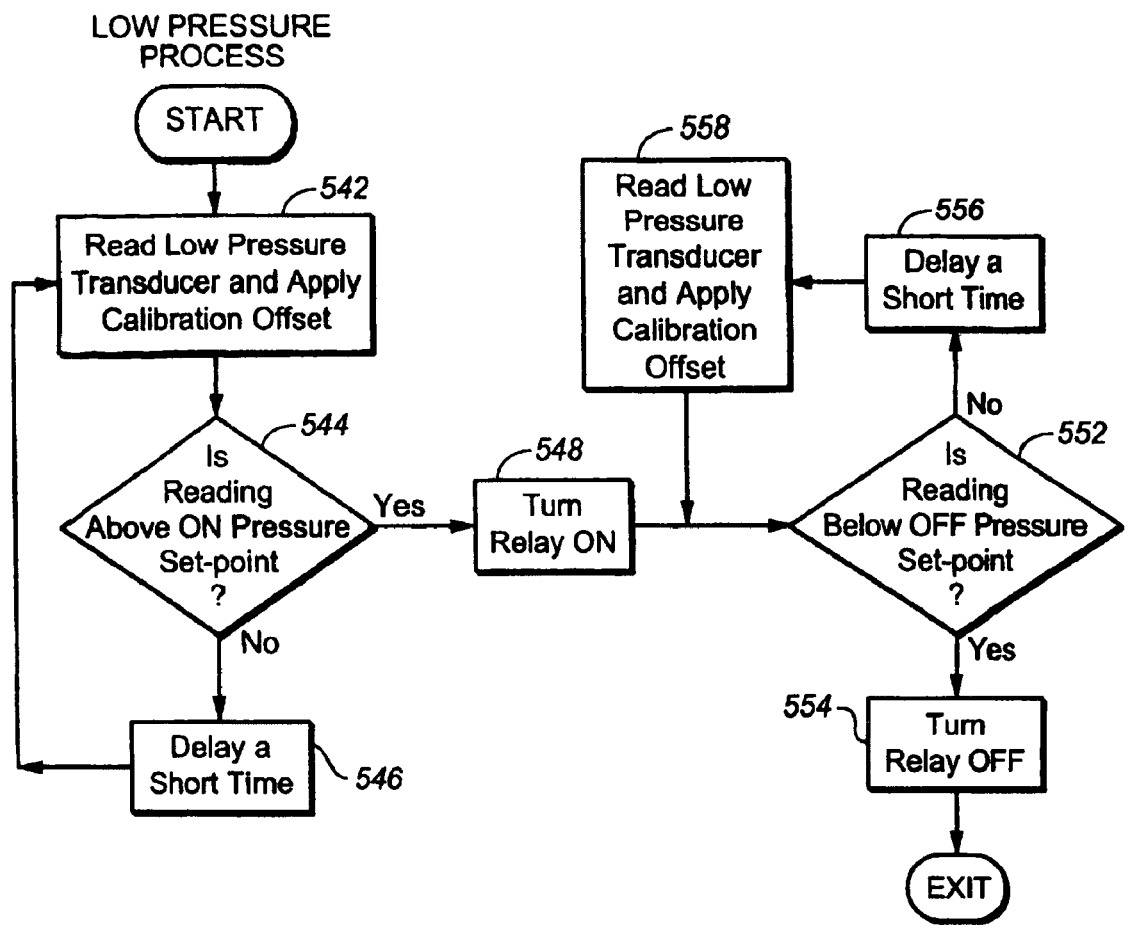
FIG. 9 is a decisional flow chart depicting a sequence of operations performed by the intelligent controller when regulating operation of the typical refrigeration or air conditioning system illustrated in FIG. 1 with a Refrigerant Low Pressure On/Off Control process.

The decisional flow chart of FIG. 9 illustrates the Low Pressure Process executed by the microcontroller included in the intelligent controller 68 during regulation by that process of the typical refrigeration or air conditioning system 20 illustrated in FIG. 1. Initially, the Low Pressure Process in processing block 542 reads the output signal from the suction-line gas-pressure sensor 72 and applies to that reading the offset measured and stored by the Auto Calibration Process illustrated in FIG. 12. After reading the output signal from the suction-line gas-pressure sensor 72 and applying the stored offset, the Low Pressure Process in decision block 544 determines if the output signal from the suction-line gas-pressure sensor 72 exceeds the ON Pressure Set-point. If the output signal from the suction-line gas-pressure sensor 72 does not exceed the ON Pressure Set-point, the Low Pressure Process delays for a short time interval in processing block 546, and then returns to processing block 542. If the output signal from the suction-line gas-pressure sensor 72 exceeds the ON Pressure Set-point, the Low Pressure Process in processing block 548 turns the relay included in the intelligent controller 68 to its on state thereby energizing operation of the motor 24. After the Low Pressure Process turns the relay to its on state, the process proceeds to decision block 552 to determine if the output signal is below the OFF Pressure Set-point. If the output signal is below the OFF Pressure Set-point, the Low Pressure Process proceeds to processing block 554 where it turns the relay included in the intelligent controller 68 to its off state thereby de-energizing operation of the motor 24, and then exits. If the output signal exceeds the OFF Pressure Set-point, the Low Pressure Process delays for a short time interval in processing block 556, and then proceeds to processing block 558 where it reads the output signal from the suction-line gas-pressure sensor 72 and applies to that reading the previously stored offset. After reading the output signal from the suction-line gas-pressure sensor 72 and applying the stored offset, the Low Pressure Process returns to decision block 552.

Figure 10:
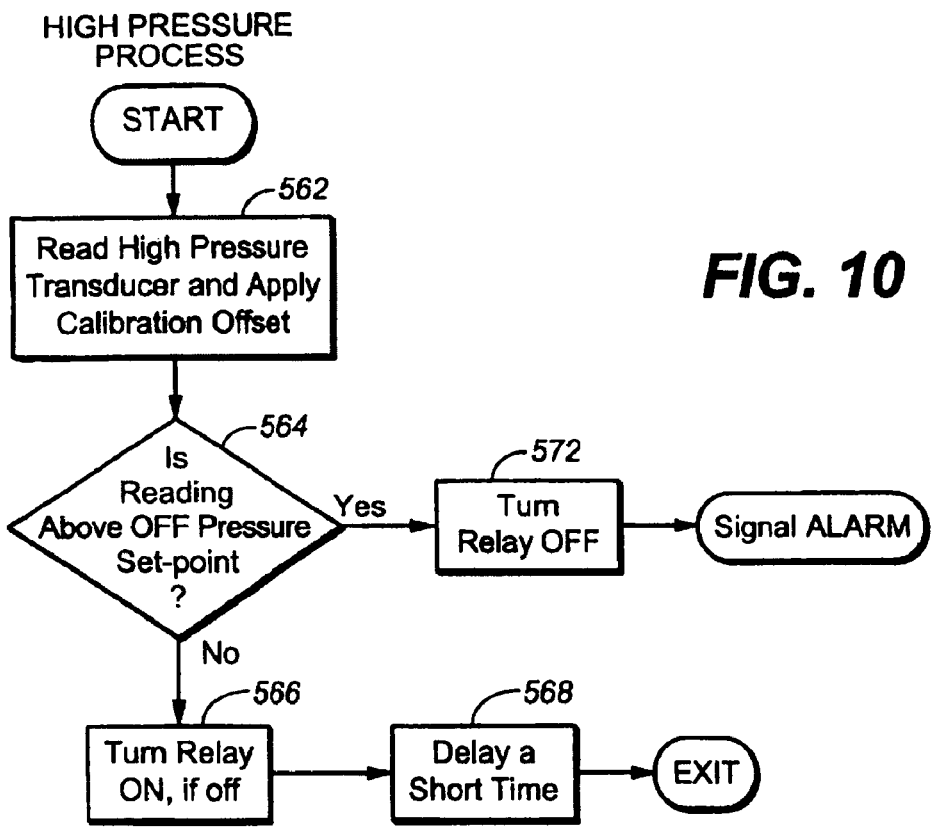
FIG. 10 is a decisional flow chart depicting a sequence of operations performed by the intelligent controller when regulating operation of the typical refrigeration or air conditioning system illustrated in FIG. 1 with a Refrigerant High Pressure Off Control process.

The decisional flow chart of FIG. 10 illustrates the High Pressure Process executed by the microcontroller included in the intelligent controller 68 during regulation by that process of the typical refrigeration or air conditioning system 20 illustrated in FIG. 1. Initially, the High Pressure Process in processing block 562 reads the output signal from the discharge-line gas-pressure sensor 78 and applies to that reading the offset measured and stored by the Auto Calibration Process illustrated in FIG. 12. After reading the output signal from the discharge-line gas-pressure sensor 78 and applying the stored offset, the High Pressure Process in decision block 564 determines if the output signal from discharge-line gas-pressure sensor 78 exceeds the High Pressure OFF Set-point. If the output signal from discharge-line gas-pressure sensor 78 does not exceed the High Pressure OFF Set-point, the High Pressure Process in processing block 566, if the relay included in the intelligent controller 68 is in its off state, turns the relay to its on state thereby energizing operation of the motor 24. After ensuring that the relay is in its on state, the High Pressure Process delays for a short time interval in processing block 568, and then exits. If the output signal from discharge-line gas-pressure sensor 78 exceeds the High Pressure OFF Set-point, the High Pressure Process in processing block 572, turns the relay to its off state thereby de-energizing operation of the motor 24, and then enters the ALARM state.

Figure 11:
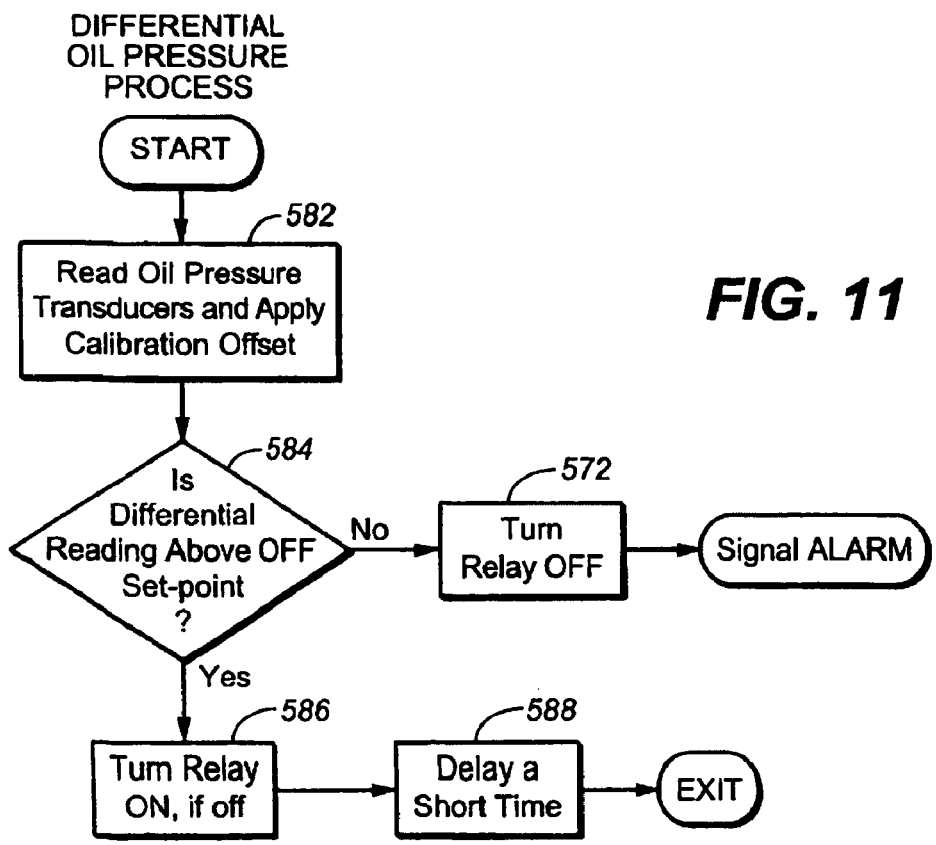
FIG. 11 is a decisional flow chart depicting a sequence of operations performed by the intelligent controller when regulating operation of the typical refrigeration or air conditioning system illustrated in FIG. 1 with a Refrigeration Compressor Oil Pressure Differential Control process.

The decisional flow chart of FIG. 11 illustrates the Differential Oil Pressure Process executed by the microcontroller included in the intelligent controller 68 during regulation by that process of the typical refrigeration or air conditioning system 20 illustrated in FIG. 1. Initially, the Differential Oil Pressure Process in processing block 582 reads output signals from both the suction-line oil-pressure sensor 74 and the discharge-line oil-pressure sensor 76, and applies to those readings the offsets measured and stored by the Auto Calibration Process illustrated in FIG. 12. After reading the output signals from both the suction-line oil-pressure sensor 74 and the discharge-line oil-pressure sensor 76 and applying the stored offsets, the Differential Oil Pressure Process in decision block 584 determines if the difference between output signals of the suction-line oil-pressure sensor 74 and the discharge-line oil-pressure sensor 76 exceeds the High Pressure OFF Set-point. If the difference between output signals exceeds the High Pressure OFF Set-point, the Differential Oil Pressure Process in processing block 586, if the relay included in the intelligent controller 68 is in its off state, turns the relay to its on state thereby energizing operation of the motor 24. After ensuring that the relay is in its on state, the Differential Oil Pressure Process delays for a short time interval in processing block 588, and then exits. If the the difference between output signals does not exceed the High Pressure OFF Set-point, the Differential Oil Pressure Process proceeds to processing block 572 where it turns the relay to its off state thereby de-energizing operation of the motor 24, and then enters the ALARM state.

Figure 12:
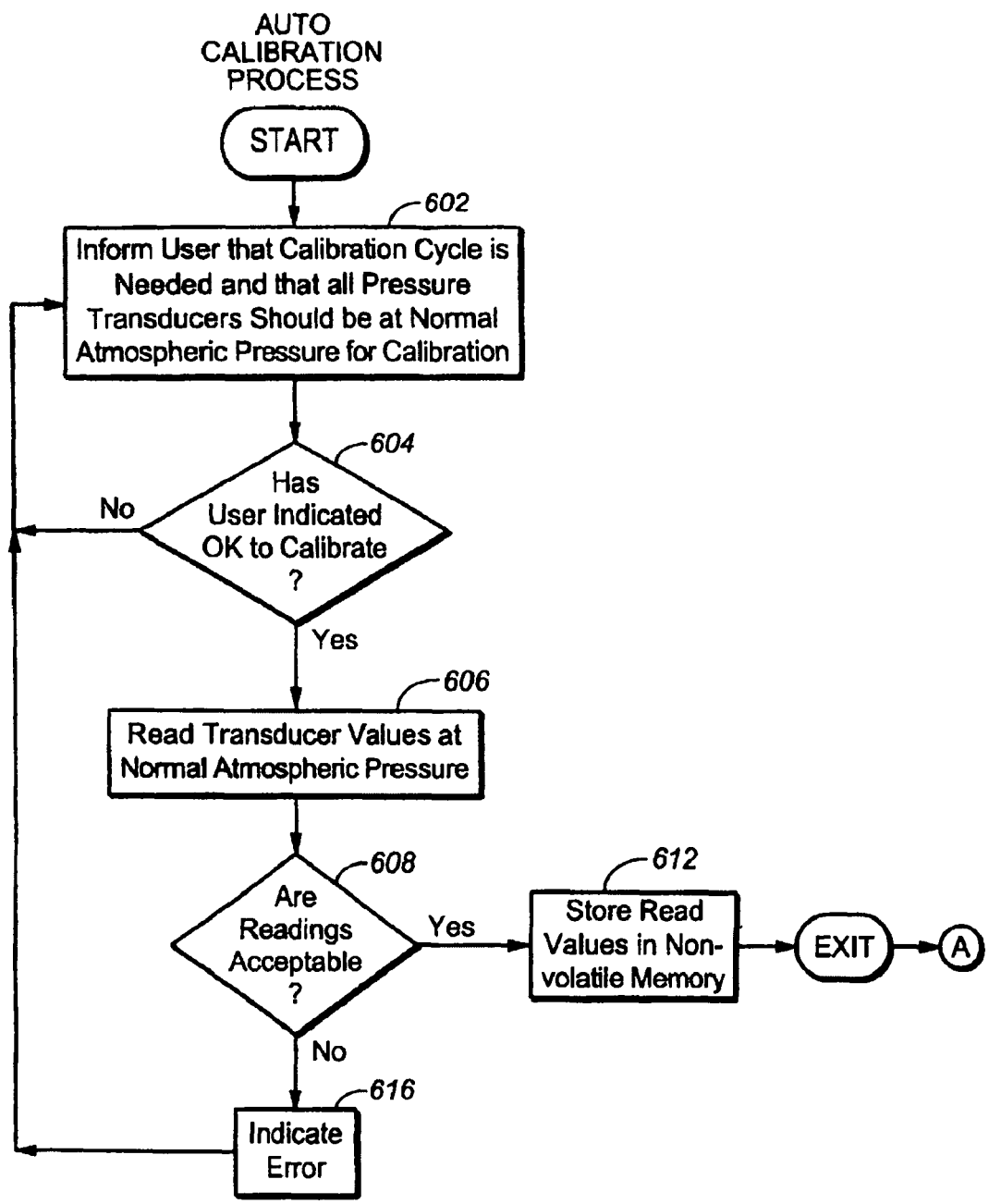
FIG. 12 is a decisional flow chart depicting a sequence of operations performed by the intelligent controller in calibrating one or more pressure sensors included in the typical refrigeration or air conditioning system illustrated in FIG. 1.

The decisional flow chart of FIG. 12 illustrates the Auto Calibration Process executed by the microcontroller included in the intelligent controller 68. Initially, the Auto Calibration Process in processing block 602 sends a message to the SUT informing the user that a calibration operation is needed, and that all sensors 72, 74, 76 and 78 must be at atmospheric pressure. After sending the message to the SUT, the Auto Calibration Process in decision block 604 determines if a response from the user permits the intelligent controller 68 to proceed with the calibration operation. If a response from the user permitting the intelligent controller 68 to proceed with the calibration operation has not been received, the Auto Calibration Process returns to processing block 602. If a response from the user has been received which permits the intelligent controller 68 to proceed with the calibration operation, the Auto Calibration Process proceeds to processing block 606 where the intelligent controller 68 reads output signals from input channels for all of the sensors 72, 74, 76 and 78 even if, in fact, there is no sensor connected to particular input channels. After obtaining output signals from what appears to be each of the sensors 72, 74, 76 and 78, in decision block 608 the Auto Calibration Process determines whether the readings are acceptable. If the readings are acceptable, the Auto Calibration Process proceeds to processing block 612 where the measured values of output signals from sensors 72, 74, 76 and 78 are stored in the non-volatile memory included in the preferred microcontroller. After storing the measured values in the non-volatile memory for subsequent use as offsets, Auto Calibration Process terminates by returning to processing block 302. If the readings are not acceptable, the Auto Calibration Process in processing block 616 indicates that an error has occurred, and returns to processing block 602.

INDUSTRIAL APPLICABILITY

While the intelligent controller 68 has been described as being programmed using the SUT which connects to the intelligent controller 68 by a cable, the intelligent controller 68 may also include an infrared communication module, and be programmed using either a personal digital assistant ("PDA") or cell phone which possesses an infrared communication capability. All that is required to permit programming the intelligent controller 68 either with an infrared equipped PDA or cell phone is merely porting the Set-Up-Tool process depicted in FIG. 3 so it can be executed by a microprocessor included in the PDA or cell phone.

Although the present invention has been described in terms of the presently preferred embodiment, it is to be understood that such disclosure is purely illustrative and is not to be interpreted as limiting. For example, while the intelligent controller 68 has been described in the context of the system 20 depicted in FIG. 1, the intelligent controller 68 may be used with cooling systems having configurations that differ from the specific system depicted in FIG. 1. Similarly, while the intelligent controller 68 has been described in the context of a programmable microcontroller, there exist other types of programmable electronic circuits, such as a state machine which in principal could be implemented in a field programmable gate array ("FPGA") or in an application specific integrated circuit ("ASIC"), which are capable of providing the programmable functionality required by the intelligent controller 68. Consequently, without departing from the spirit and scope of the disclosure, various alterations, modifications, and/or alternative applications of the disclosure will, no doubt, be suggested to those skilled in the art after having read the preceding disclosure. Accordingly, it is intended that the following claims be interpreted as encompassing all alterations, modifications, or alternative applications as fall within the true spirit and scope of the disclosure.

What is claimed is:

1. An intelligent controller adapted for regulating operation of a system selected from a group consisting of a refrigeration system and an air conditioning system, the system including at least:
    a) a compressor;
    b) an electric motor that drives the compressor;
    c) a compressor suction line connected to an intake side of the compressor; and
    d) a compressor discharge line connected to a discharge outlet side of the compressor,
the system further including at least one pressure sensor for producing a first output electrical signal that corresponds to pressure existing at the pressure sensor, the intelligent controller comprising:
    a programmable electronic circuit for receiving the first output electrical signal produced by the at least one pressure sensor and responsive thereto energizing operation of the motor thereby regulating operation of the system, the programmable electronic circuit performing a calibration operation in which the programmable electronic circuit measures the output electrical signal received from the at least one pressure sensor and stores as an offset the value so measured, the programmable electronic circuit subsequently applying the stored offset for adjusting a value of the output electrical signal received from the at least one pressure sensor during normal operation of the system.

2. The intelligent controller of claim 1 wherein the calibration operation is performed at ambient atmospheric pressure.

3. The intelligent controller of claim 1 or 2 wherein the at least one pressure sensor is selected from a group consisting of:
    a) a suction-line gas-pressure sensor connected to the compressor suction line;
    b) a suction-line oil-pressure sensor connected at the intake side of the compressor;
    c) a discharge-line oil-pressure sensor connected at the discharge outlet side of the compressor; and
    d) a discharge-line gas-pressure sensor connected to the compressor discharge line.

4. The intelligent controller of claim 3 wherein the selected pressure sensor is the suction-line gas-pressure sensor, wherein the programmable electronic circuit is programmed with both an ON Pressure Set-point and an OFF Pressure Set-point, and wherein the programmable electronic circuit:
    a) energizes operation of the motor when the output electrical signal indicates that refrigerant pressure in the compressor suction line exceeds the ON Pressure Set-point; and
    b) de-energizes operation of the motor when the output electrical signal indicates that refrigerant pressure in the compressor suction line is less than the OFF Pressure Set-point.

5. The intelligent controller of claim 3 wherein the selected pressure sensor is the discharge-line gas-pressure sensor, wherein the programmable electronic circuit is programmed with a High Pressure OFF Set-point, and wherein:
    a) the programmable electronic circuit energizes operation of the motor when the output electrical signal indicates that refrigerant pressure in the compressor discharge line is less than the High Pressure OFF Set-point; and
    b) when the output electrical signal indicates that refrigerant pressure in the compressor discharge line exceeds the High Pressure OFF Set-point, the programmable electronic circuit:
        i. de-energizes operation of the motor; and
        ii. enters an ALARM state.

6. The intelligent controller of claim 3 wherein the selected pressure sensor is the suction-line oil-pressure sensor, and the system further includes a discharge-line oil-pressure sensor for producing a second output electrical signal that is also received by the programmable electronic circuit and that corresponds to pressure existing at the discharge-line oil-pressure sensor, wherein the programmable electronic circuit is programmed with an Oil Pressure Differential OFF Set-point, and wherein:
    a) the programmable electronic circuit energizes operation of the motor when a difference between the first and second output electrical signals is not below the Oil Pressure Differential OFF Set-point; and
    b) when the difference between the first and second output electrical signals is below the Oil Pressure Differential OFF Set-point, the programmable electronic circuit:
        i. de-energizes operation of the motor; and
        ii. enters an ALARM state.

7. The intelligent controller of claim 1 or 2 wherein the programmable electronic circuit provides a time interval during which the motor is energized before the programmable electronic circuit processes the output electrical signal received from the at least one pressure sensor for regulating operation of the system.

8. The intelligent controller of claim 7 wherein the time interval is seventy-five (75) seconds.

* * * * *